United States Patent

[11] 3,580,054

| [72] | Inventor | Hermann Schlumbaum<br>Wennigsen, Deister, Germany |
| --- | --- | --- |
| [21] | Appl. No. | 765,078 |
| [22] | Filed | Oct. 4, 1968 |
| [45] | Patented | May 25, 1971 |
| [73] | Assignee | Stephan-Werke GMBH & Co.<br>Hamelor/Weser, Germany |
| [32] | Priority | Oct. 5, 1967 |
| [33] | | Germany |
| [31] | | P 16 48 736.8 |

[54] APPARATUS FOR DETECTING LEAKS IN HOLLOW BODIES
7 Claims, 4 Drawing Figs.

[52] U.S. Cl............................................... 73/49.2
[51] Int. Cl.............................................. G01m 3/26
[50] Field of Search................................. 73/49.2,
49.7, 40, 116, 46, 47

[56] References Cited
UNITED STATES PATENTS

| 1,373,824 | 4/1921 | McKenzie | 73/46UX |
| --- | --- | --- | --- |
| 2,212,466 | 8/1940 | Bradford | 73/47 |
| 2,494,936 | 1/1950 | Edelen | 73/49.7 |
| 2,855,777 | 10/1958 | Garrett | 73/40 |

FOREIGN PATENTS

| 391,218 | 4/1933 | Great Britain | 73/47 |
| --- | --- | --- | --- |

*Primary Examiner*—S. Clement Swisher
*Assistant Examiner*—William A. Henry, II
*Attorney*—Michael S. Striker ABSTRACT: Apparatus for detecting the presence or absence of leaks in bodies of automotive vehicles comprises a frame which supports an electric motor serving to drive a suction generating device whose inlet is connected with a suction conduit. The latter can be placed against the opening of an automobile body to evacuate air, and a gauge, U-tube or analogous measuring device is provided to determine the pressure in the opening and/or in the suction conduit to thereby indicate the presence or absence of leaks. The frame may be provided with legs and/or wheels so that it can be readily transported between storage and one or more locales of use. The frame is further provided with means for storing the suction conduit, for storing the conductor which supplies current to the motor, and/or for storing nozzles one of which can be coupled to the intake end of the suction conduit for insertion into or for placing against an opening.

PATENTED MAY 25 1971 3,580,054

Inventor:
HERMANN SCHLUMBAUM
BY Michael S. Striker
his ATTORNEY

APPARATUS FOR DETECTING LEAKS IN HOLLOW BODIES

BACKGROUND OF THE INVENTION

The present invention relates to apparatus for detecting the presence or absence of leaks in bodies of automotive vehicles or other types of hollow structures.

It is already known to determine the presence or absence of leaks in bodies of automobiles by resorting to a conduit whose intake end is placed into or against an opening in the body of an automobile. The conduit is connected to the inlet of a stationary suction generating device which is driven by a stationary motor or the like. Such apparatus are employed exclusively in automobile manufacturing plants which are invariably equipped with one or more suction generating devices, such as large blowers, and with appropriate prime movers therefor. The suction generating device or devices are permanently installed in a particular area of the plant and are connected with automobile bodies by longer or shorter suction conduits, depending on circumstances.

A drawback of just described conventional apparatus is that they are too bulky, too expensive and often too complicated for use in or at service stations, repair shops, garages and similar institutions where the testing of automobile bodies is often desirable or necessary. Such institutions are often too small or too crowded to accommodate a fixedly mounted bulky testing or detecting apparatus. Moreover, a large garage or repair shop would often require two or more apparatus because the laying of lengthy suction conduits could interfere with transport of vehicles and/or other operations which are performed in connection with servicing, inspection and/or repairing of automobiles. Testing of automobile bodies is desirable for a variety of readily understandable reasons, and such testing must be carried out to determine the presence or absence of leaks in new bodies but particularly in bodies of automobiles which were involved in collisions or other types of accidents.

SUMMARY OF THE INVENTION

It is an object of the present invention to provide a relatively simple, compact, inexpensive and versatile apparatus for detection of the presence or absence of leaks in hollow bodies, particularly (but not exclusively) in bodies of automotive vehicles, and to construct and assemble the apparatus in such a way that it can be used in a manufacturing plant, in a repair shop, in a service station, in a garage and/or anywhere else where rapid testing of bodies is desirable or necessary.

Another object of the invention is to provide an apparatus of the just outlined character which can be readily transported between storage and one or more locales of use, which can be transported or stored by a single person, which can be set up in a small area, and which can be used with equal advantage for testing of new or for testing of damaged or used automobile bodies.

A further object of the invention is to provide a testing apparatus which can be used for testing of bodies having small, large, circular and/or otherwise configurated openings for evacuation of air.

An additional object of the invention is to provide an apparatus which can be manipulated and serviced by persons of average or less than average skill.

The improved apparatus comprises a prime mover, preferably an electric motor, a suction generating device (e.g., a blower or pump) having an inlet which draws air in response to starting of the motor, and a flexible suction conduit whose discharge end is connected with the inlet and whose intake end can be placed into or against the opening of a hollow body, particularly an opening provided in the body of an automotive vehicle. In accordance with an important feature of the invention, the motor, the suction generating device and the conduit form part of a preferably compact and lightweight aggregate which is transportable between storage and one or more locales of use. To this end, the aggregate may be provided with a frame having ground-contacting legs or wheels. A wheel-mounted aggregate can be readily pushed or pulled between several locations. A leg-mounted aggregate can also be pushed or pulled, or it may be mounted on a dolly or transported by a fork lift truck or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
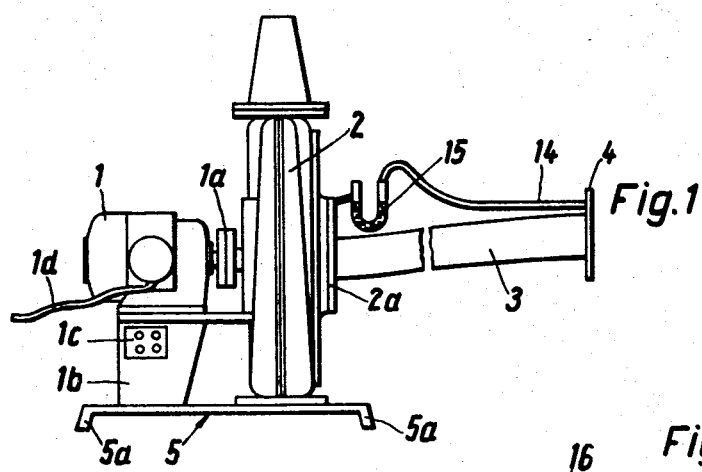
FIG. 1 is a schematic side elevational view of an apparatus which embodies one form of the invention.

The apparatus of FIG. 1 comprises a prime mover 1, preferably an electric motor, which drives a suction generating device 2 and is directly connected therewith, for example, by way of a clutch 1a. The inlet 2a of the suction generating device (preferably a blower) is connected with the discharge end of a flexible suction conduit 3 whose intake end can be placed against or inserted into an opening provided in the body of an automotive vehicle, not shown. The intake end of the conduit 3 accommodates a flanged nozzle 4 whose orifice communicates with the interior of the conduit and draws air from the opening of the body. The components 1, 2 and 3 form parts of a transportable or transferrable aggregate which further comprises a frame 5 having two or more ground-contacting legs 5a. The bracket 1b of the motor 1 and the lower part of the suction generating device 2 are mounted on a platform or bottom portion of the frame 5. The entire aggregate is sufficiently compact to be readily transferred between storage and one or more locales of use, for example, in an automobile body repair shop, in an automobile manufacturing plant, in a garage, in a service station or in another institution or workshop where the bodies of automobiles are being tested for presence or absence of leaks. The nozzle 4 is preferably but need not be detachable from the conduit 3. The bracket 1b carries a control panel 1c for the controls of the motor 1 and the latter is provided with a conductor cable 1d by means of which it can be connected to an outlet or another suitable source of electrical energy, not shown.

The aggregate further comprises a measuring device which measures suction in the conduit 3 to thus determine the presence or absence of leaks in the body of an automobile. This measuring device comprises a U-tube 15 which is mounted on the suction generating device 2 and is connected with the orifice of the nozzle 4 by a flexible conduit 14. The latter is located externally of the conduit 3. The flange of the nozzle 4 can be inserted into or placed against an opening in the automobile body.

Figure 2:
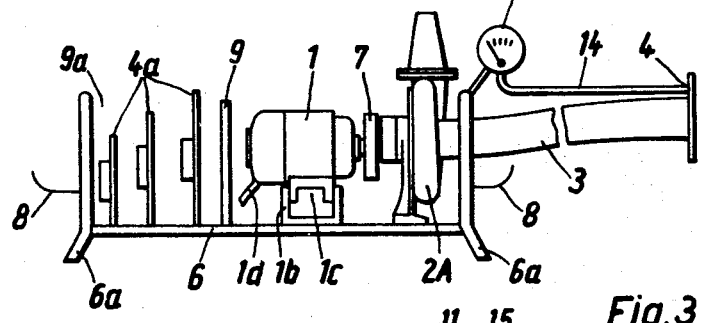
FIG. 2 is a schematic side elevational view of a second apparatus.

FIG. 2 illustrates a second apparatus which again comprises a prime mover 1 here shown as an electric motor mounted on a bracket 1b and arranged to drive a rotary element (not shown) of a compact lightweight suction generating device or blower 2A by way of a transmission 7, for example, a friction clutch or a belt transmission. The suction conduit is shown at 3, a separable nozzle 4 is shown at the intake end of the conduit 3, and a frame for the parts 1, 2A is shown at 6. This frame comprises legs 6a and is further provided with means 8 for supporting the conduit 3 when the aggregate is not in use. In addition, the supporting means 8 may serve to accommodate the cable 1d when the motor 1 is disconnected from the energy source. The frame 6 further defines a compartment 9a which is separated from the motor 1 by a partition 9 and serves to accommodate one or more spare nozzles 4a of different sizes and/or other spare parts. The controls of the motor 1 are shown at 1c.

The measuring means of the apparatus shown in FIG. 2 comprises a dial gauge 16 which is connected with the orifice of the nozzle 4 or directly with the opening of an automobile body by a flexible conduit 14 extending externally of the suction conduit 3. The gauge 16 is supported by the suction generating device 2A. The compartment 9a may accommodate a rack (not shown) for convenient storage and ready removal of spare nozzles 4a.

Figure 3:
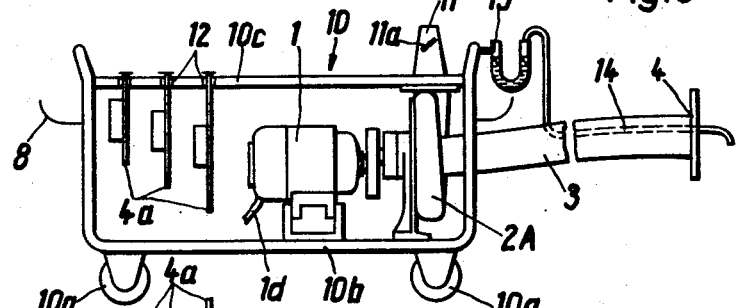
FIG. 3 is a schematic side elevational view of a third apparatus.

FIG. 3 illustrates a third apparatus having a frame 10 which is mounted on ground-contacting wheels 10a so that the apparatus can be readily transported to and from the locale of desired use. The motor 1 and the suction generating device 2A are mounted on the bottom wall 10b of the frame 10, and this frame further comprises a top portion of wall 10c which is provided with means 12 for supporting one or more spare nozzles 4a of different sizes and/or shapes. The major part of the conduit 14 of the U-tube 15 is accommodated in the interior of and protected by the conduit 3. The nozzle 4 at the intake end of the conduit 3 is readily separable so that it can be replaced with one of the spare nozzles 4a. The outlet 11 of the suction generating device 2A discharges air which is drawn by way of the inlet upwardly so that the stream of air issuing from the suction generating device is less likely to interfere with the work of persons carrying out the testing operation. This outlet 11 extends upwardly through the top wall 10c of the frame 10. The top wall 10c can further serve as a depository for tools, additional spare parts and/or other purposes. The outlet 11 is provided with a throttle valve 11a by means of which the operator can obtain the desired degree of vacuum in the hollow body.

Figure 4:
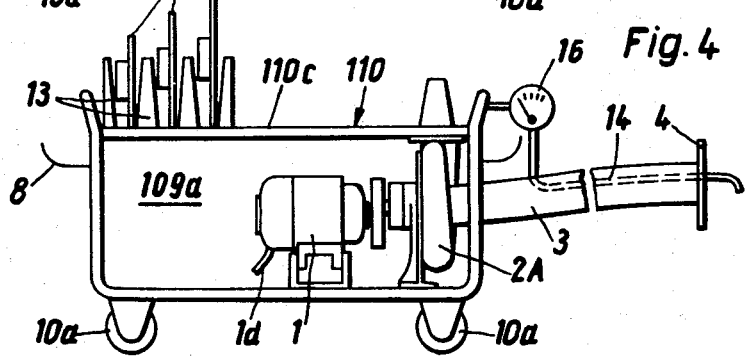
FIG. 4 is a schematic side elevational view of a fourth apparatus.

FIG. 4 shows a fourth apparatus which is very similar to the apparatus of FIG. 3 and wherein analogous parts are denoted by similar reference numerals. The top wall 110c of the frame 110 is provided with a rack 13 which accommodates spare nozzles 4a. The dial gauge 16 is mounted on the suction generating device 2A and the major part of its conduit 14 is accommodated in and protected by the conduit 3. The remaining portion of the conduit 14 extends from the conduit 3 in close proximity of the suction generating device 2A. The rack 13 may comprise one or more preferably forked upwardly extending partitions for the spare nozzles 4a. It is clear that the overall length of the frame 110 can be reduced considerably without departing from the spirit of my invention. Such reduction in the length of the frame 110 is possible because the spare nozzles 4a are supported on, rather than at a level below, the top wall 110c. Alternatively, the compartment 109a to the left of the motor 1 shown in FIG. 4 can be utilized as a depository for additional spare nozzles 4a and/or for other parts which are used in connection with a testing operation. For example, such compartment may accommodate the cable 1d.

The exact design of the gauge 16 forms no part of the present invention. This gauge may comprise a needle which is automatically biased to a starting position and is encapsulated in the casing of the gauge.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. Apparatus for detecting the presence or absence of leaks in hollow bodies, particularly in automobile bodies, comprising suction generating means having an inlet; a primer mover operatively connected with and arranged to drive said suction generating means to produce suction at said inlet; flexible conduit means having a discharge end connected with said inlet and an intake end adapted to evacuate air by way of an opening in said hollow body, and a frame supporting said prime mover, said suction generating means and said conduit means and forming therewith a transportable aggregate; said flexible conduit means extending beyond said frame; means for measuring suction in said conduit means; and second conduit means connecting said measuring means with said intake end.

2. Apparatus as defined in claim 1, wherein said suction generating means comprises an upwardly directed outlet which discharges air drawn into said suction generating means by way of said inlet.

3. Apparatus as defined in claim 1, wherein said outlet comprises an adjustable throttle valve to obtain the desired degree of vacuum in the hollow body.

4. Apparatus as defined in claim 1, wherein said measuring means comprises a U-tube.

5. Apparatus as defined in claim 1, wherein said measuring means comprises a guage.

6. Apparatus as defined in claim 1, wherein at least a portion of said second conduit means is accommodated in the interior of said first mentioned conduit means.

7. Apparatus as defined in claim 6, wherein the major part of said second conduit means is accommodated in the interior of said first mentioned conduit means and wherein the remainder of said second conduit means extends from said first mentioned conduit means in close proximity of said suction generating means.